(12) United States Patent
Takano et al.

(10) Patent No.: US 6,566,843 B2
(45) Date of Patent: May 20, 2003

(54) DC POWER SOURCE UNIT WITH BATTERY CHARGING FUNCTION

(75) Inventors: Nobuhiro Takano, Hitachinaka (JP); Takeshi Takeda, Hitachinaka (JP); Eiji Nakayama, Hitachinaka (JP); Kazuhiko Funabashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/118,898

(22) Filed: Apr. 10, 2002

(65) Prior Publication Data

US 2002/0149345 A1 Oct. 17, 2002

(30) Foreign Application Priority Data

Apr. 10, 2001 (JP) .................................... 2001-111022
Apr. 10, 2001 (JP) .................................... 2001-111023

(51) Int. Cl.[7] ............................................ H01M 10/46
(52) U.S. Cl. ...................................................... 320/114
(58) Field of Search .................................. 320/107, 110, 320/114, 115, 132

(56) References Cited

U.S. PATENT DOCUMENTS 5,159,256 A * 10/1992 Mattinger et al.
6,104,162 A * 8/2000 Sainsbury et al.
6,243,276 B1 * 6/2001 Neumann

FOREIGN PATENT DOCUMENTS

JP          2000-184614          6/2000

* cited by examiner

*Primary Examiner*—Edward H. Tso
(74) *Attorney, Agent, or Firm*—Sughrue Mion, PLLC

(57) ABSTRACT

A DC power source unit supplies a DC voltage to an electrically powered tool through an adapter and also charges a battery pack used as an alternative power source of the tool. With the DC power source unit of the invention, charging of the battery pack is stopped and supply of power to the tool is started instantaneously when the power switch of the tool is turned ON. The DC power source unit is also capable of outputting selective one of different drive voltages corresponding to the rated drive voltages of a variety of different tools and capable of charging battery packs with different battery voltages.

17 Claims, 5 Drawing Sheets

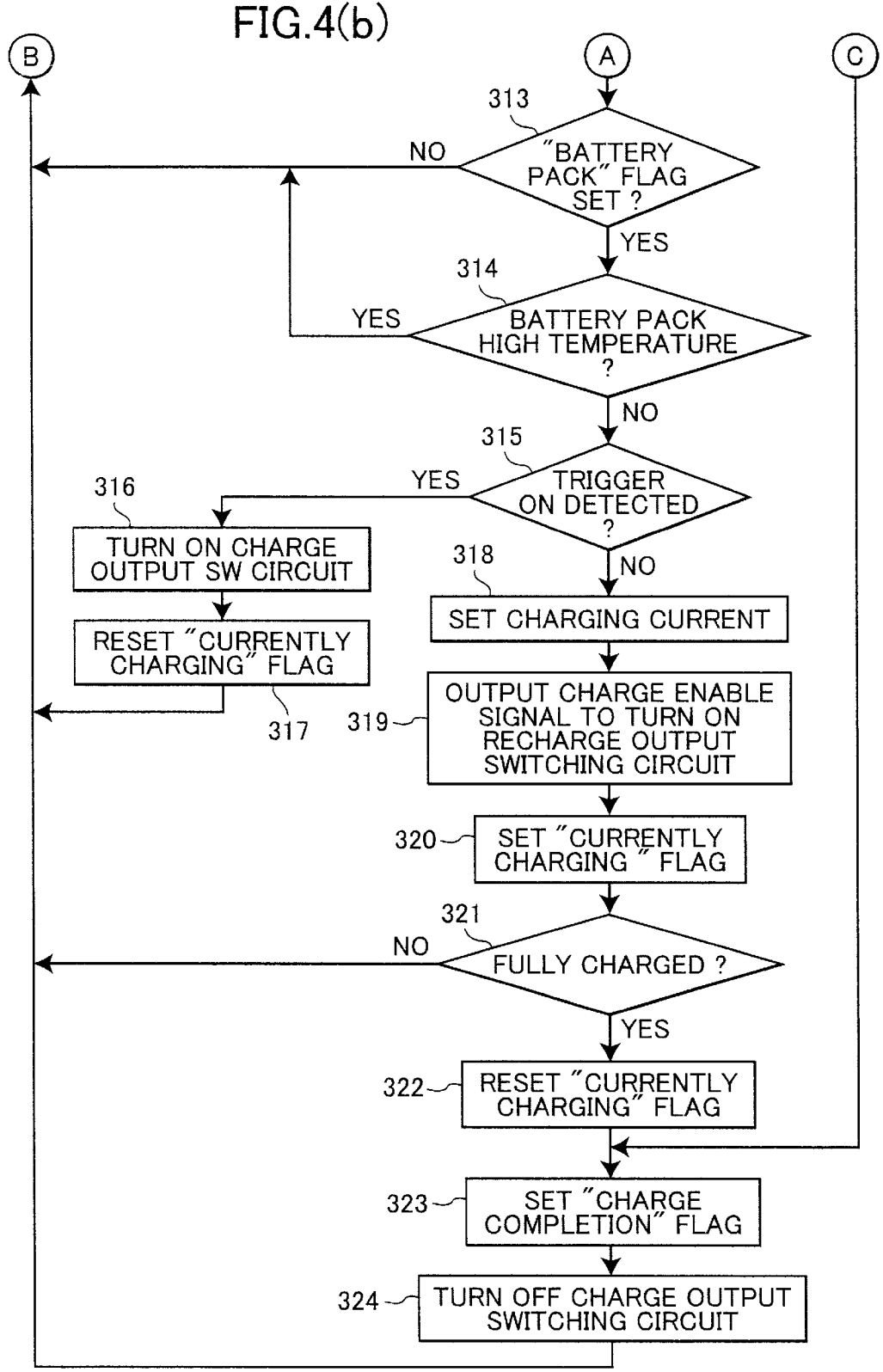

DC POWER SOURCE UNIT WITH BATTERY CHARGING FUNCTION

BACKGROUND OF THE INVENTION

1. Field of the Invention

The present invention relates to a DC power source unit that can selectively charge a battery pack, which is used as a power source for a cordless power tool, and supply DC voltage to the cordless power tool through an adaptor shaped like the battery pack.

2. Description of the Related Art

Cordless power tools are convenient because they can be used anywhere without being restricted by the length of a power cable. However, whenever the battery runs low, the battery pack needs to be removed and charged or else replaced with another battery pack that has already been charged.

A DC power source unit that converts alternating current to direct current can be used along with the battery pack. That is, the DC power source unit can be used when the cordless power tool is to be operated in a single place that has a source of alternating current, and the battery pack can be used when the cordless power tool is to be operated at several different places that have no source of alternating current.

However, this situation has a problem in that the operator of the cordless power tool must carry both the DC power source unit and the battery pack's charging unit to the work area. Japanese Patent Publication No. 2000-184614(A) discloses a DC power source unit with a charging function. When the DC power source unit detects that the attached cordless power tool is being operated, it supplies power only to the cordless power tool and not for charging purposes. On the other hand, when DC power source unit detects that the cordless power tool is not being operated, then it charges a battery pack.

Here, the DC power source unit disclosed in Japanese Patent Publication No. 2000-184614(A) will be described in more detail. The DC power source unit includes a microcomputer, a DC-DC converter, and a mode switch for switching between charge of the battery pack and supplying power to the cordless power tool. When the power switch of the cordless power tool is turned ON while the DC power source unit is charging a battery pack, then the microcomputer outputs a signal for turning OFF the DC-DC converter. Once the mode switch is switched from charging the battery pack to supplying power to the cordless power tool, then the DC-DC converter is turned ON again, whereupon the cordless power tool starts operating.

However, the configuration disclosed in the above-mentioned Japanese Patent Publication has the following drawback. While a battery pack is being charged, there is a slight delay from when the operator turns ON the power switch of the cordless power tool until the cordless power tool actually starts operating. This gives the operator the sensation that something is not right.

Further, the configuration disclosed in the above-mentioned Japanese Patent Publication deals with only a single fixed rated voltage of battery pack and cordless power tool. However, in view of the fact that there are a variety of different cordless power tools that operate with different rated voltages, it is desirable that the power source unit be capable of outputting desired drive voltages that correspond to the rated voltages of a variety of different cordless power tools so that the power source unit can drive all of these cordless power tools. In addition, it is desirable that the power source unit have a charging function capable of charging a variety of different battery packs with different battery voltages.

SUMMARY OF THE INVENTION

In view of the foregoing, it is an object of the present invention to overcome the above-described problems, and provide a DC power source unit with a charging function wherein charging is stopped and supply of power to the cordless power tool is started instantaneously when the power switch of the cordless power tool is turned ON, so that the operator does not feel anything is wrong.

It is another object of the present invention to provide a DC power source unit with a charging function capable of outputting drive voltages that correspond to the rated drive voltages of a variety of different cordless power tools and capable of charging battery packs with a different battery voltages.

To achieve the above and other objects, there is provided according to one aspect of the invention a DC power source unit that can stop charging the battery pack and start supplying power to the cordless power tool instantaneously when the power switch of the cordless power go, tool is turned ON. The DC power source unit includes a switching power source for implementing an AC-DC conversion and providing a DC power; a battery pack connecting portion for connecting the battery pack to charge with the DC power provided from the switching power source; an adapter for supplying the DC power provided from the switching power source to the tool; a power source output controller for controlling the DC power provided from the switching power source in accordance with the DC power supplied to the tool and to the battery pack; a power output switching circuit for switching between supplying the DC power to the tool through the adapter and charging the battery pack; and a trigger detector for detecting that the power switch of the tool is turned ON and outputting an ON signal indicative of ON of the power switch to the power output switching circuit. In response to the ON signal, the power output switching circuit instantaneously allows the DC power to be supplied to the tool and prohibits the battery pack from being charged.

The DC power source unit according present invention supplies power to the tool, but does not charge the batter while the tool is being operated. On the other hand, the DC power source unit charges the battery pack while the tool is not being operated. More specifically, when the power switch of the tool is turned ON while a battery is being charged, then instantaneously charging operations are stopped and supply of power is switched to the cordless power tool. Therefore, the operator does not get the feeling that something is wrong.

According to another aspect of the invention, there is provided a DC power source unit that is capable of outputting drive voltages that correspond to the rated drive voltages of a variety of different cordless power tools and capable of charging battery packs with a different battery voltages. The DC power source unit includes a switching power source for implementing an AC-DC conversion and providing selective one of a plurality of different output voltages corresponding to a plurality of different drive voltages of the tools and selective one of a plurality of different charge currents corresponding to the plurality of different battery packs; a battery pack connecting portion for connecting each of the plurality of battery packs to charge with a corresponding charge current; an adapter for supplying an output voltage among the plurality of different output voltages to a corresponding tool; a voltage/current setting circuit for setting the output voltage and the charging current output from the switching power source to predetermined values; a power output switching circuit for switching between supplying the DC power to the tool through the adapter and charging the battery pack; a battery condition detector for detecting a condition of the battery pack and providing a battery condition signal; a power source output detector for detecting the output voltage and the charging current from the switching power source and also detecting that the power switch of the tool is turned ON, and for outputting a power source output detection signal; an output current detector for detecting output current from the switching power source and outputting an output current detection signal; and a controller for controlling, based on the power source output detection signal, the voltage/current setting circuit so that the voltage/current setting circuit sets the output voltage to a value corresponding to a rated voltage of the tool.

BRIEF DESCRIPTION OF THE DRAWINGS

The above and other objects, features and advantages of the invention will become more apparent from reading the following description of the embodiment taken in connection with the accompanying drawings in which:

FIGS. 4(a) and 4(b) are flowcharts illustrating operations of the DC power source unit according to a second embodiment of the invention.

DETAILED DESCRIPTION OF THE PREFERRED EMBODIMENTS

A direct current (DC) power source unit 100 according to an embodiment of the present invention will be described while referring to the accompanying drawings.

Figure 1:
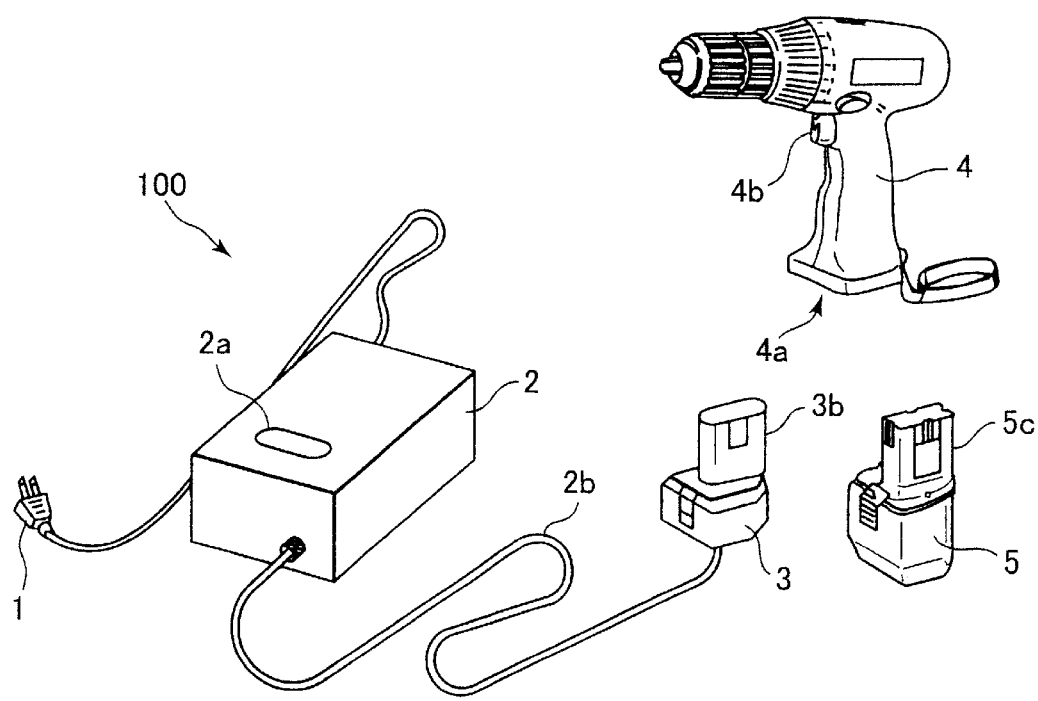
FIG. 1 is a perspective view showing a DC power source unit with a charging function according to an embodiment of the present invention.

As shown in FIG. 1, a cordless power tool 4 is used with selective one of the DC power source unit 100 and a battery pack 5. The cordless power tool 4 includes a power switch 4b. The battery pack 5 includes an insertion portion 5c that is detachably mountable into a handgrip recess 4a of the cordless power tool 4.

The DC power source unit 100 includes an AC cord 1, a main unit 2, and an adapter 3. The AC cord 1 connects the main unit 2 to a commercial alternating current (AC) power source. Also, an output cable 2b connects the main unit 2 to the adapter 3. The adapter 3 includes an adapter plug 3b which has the same shape as the insertion portion 5c of the battery pack 5. The adapter plug 3b is inserted into the handgrip recess 4a of the cordless power tool 4 in order to supply power to the cordless power tool 4. The main unit 2 has a battery pack insertion recess 2a with the same shape as the handgrip recess 4a of the cordless power tool 4. The insertion portion 5c of the battery pack 5 is inserted into the battery pack insertion recess 2a in order to charge the battery pack 5 in a manner to be described later.

Figure 2:
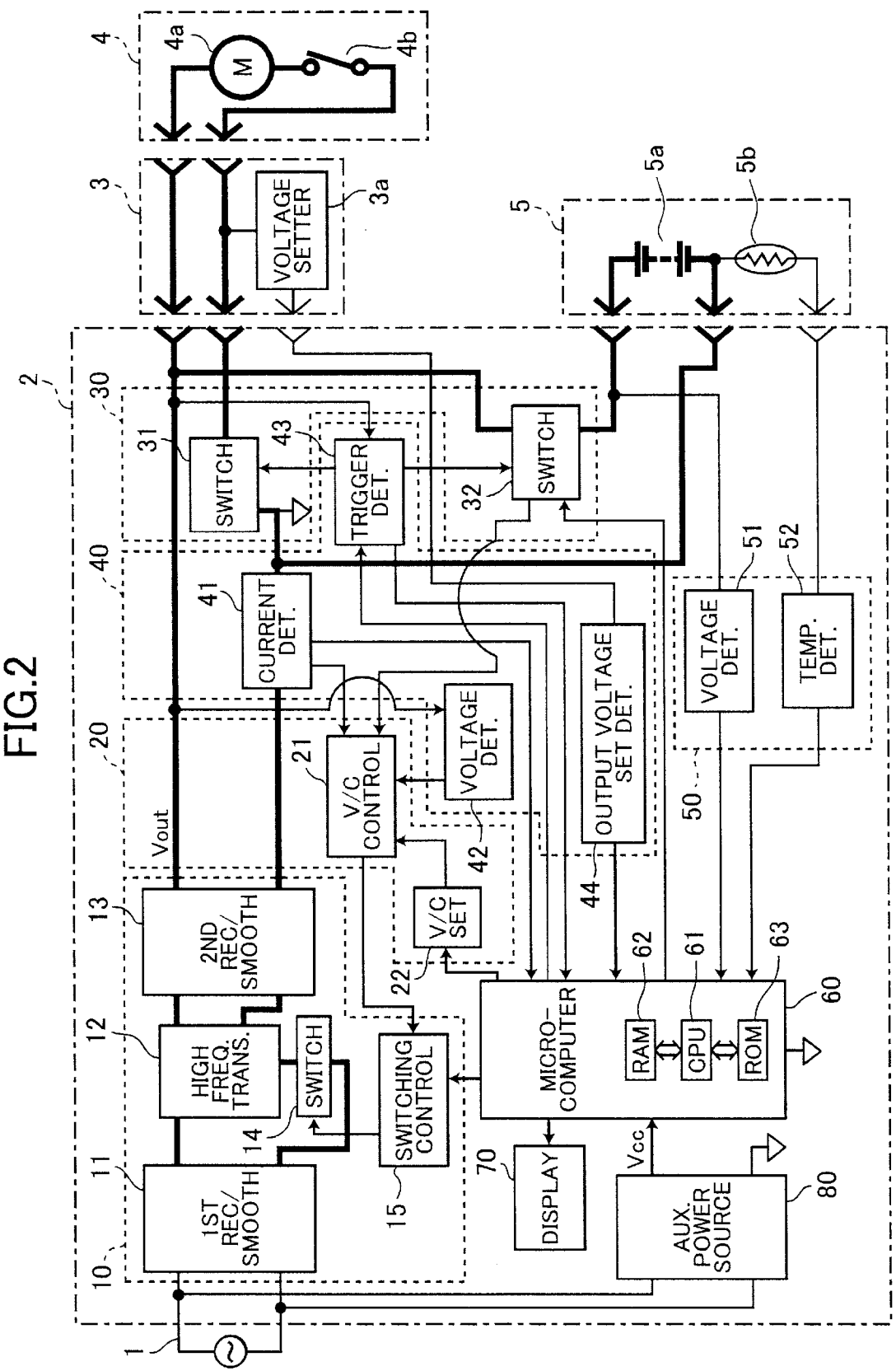
FIG. 2 is a block diagram showing an electrical arrangement of the DC power source unit according to a first embodiment of the invention.

As shown in FIG. 2, the adapter 3 further includes an output voltage setter 3a for designating the voltage that corresponds to the rated voltage of the cordless power tool 4 attached to the adapter 3. The cordless power tool 4 also includes a DC motor 4a connected in series with the power switch 4b. When the power switch 4b is turned ON, then DC power is supplied from the main unit 2 through the adapter 3 to the cordless power tool 4.

The battery pack 5 further includes a chargeable battery 5a and a temperature sensor 5b. The temperature sensor 5b is attached adjacent to or in contact with the chargeable battery 5a. A thermistor is, for example, used as the temperature sensor 5b.

As shown in FIG. 2, the main unit 2 includes a switching power source 10, a power source output controller 20, a power source output switcher 30, a power source output detector 40, a battery condition detector 50, and a microcomputer 60.

The switching power source 10 includes a first rectifying and smoothing circuit 11, a high-frequency transformer 12, a second rectifying and smoothing circuit 13, a switching element 14, and a switching control circuit 15. The switching control circuit 15 adjusts output voltage and output current from the second rectifying and smoothing circuit 13 by changing width of the pulse applied to the switching element 14.

The power source output controller 20 includes a voltage/current control circuit 21 and a voltage/current setting circuit 22. The voltage/current setting circuit 22 sets the value of a drive voltage required for driving the connected cordless power tool 4 and the value of a current required for charging a mounted battery pack 5. Based on signals from an output current detecting circuit 41 and a voltage detection circuit 42 of the power source output detector 40, the voltage/current control circuit 21 controls the switching power source 10 to adjust voltage and current of power output from the main unit 2 to match values set in the voltage/current setting circuit 22.

That is, while the power switch 4b is turned ON to drive the cordless power tool 4, the voltage/current control circuit 21 receives a current signal from the output current detecting circuit 41 and a voltage signal from the voltage detection circuit 42 that indicate actual current and voltage, respectively, being supplied to the cordless power tool 4. The voltage/current control circuit 21 feeds back these current and voltage signals to the switching control circuit 15 so that the switching control circuit 15 can control the switching duty of the switching element 14 in order to compensate for voltage drop across the cable 2b of the adapter 3 and thus maintain the voltage supplied to the cordless power tool 4 to levels set in the voltage/current setting circuit 22.

On the other hand, while the power switch 4b is turned OFF and a battery pack 5 is mounted in the main unit 2 for charging, the voltage/current control circuit 21 receives the current signal from the output current detecting circuit 41 and feeds back to the switching control circuit 15. The switching control circuit 15 controls the switching duty of its switching element 14 to control charge current supplied to the battery pack 5. The switching control circuit 15 further controls the switching duty of the switching element 14 based on a signal from the battery condition detector 50.

The power source output switcher 30 includes a power source output switch circuit 31 and a charge output switch circuit 32. The power source output switch circuit 31 enables supply of power output to the cordless power tool 4 when the power switch 4b is turned ON. The charge output switch circuit 32 enables charging of the battery pack 5 when the cordless power tool 4 is not being used.

The power source output detector 40 includes an output current detecting circuit 41, a voltage detection circuit 42, a trigger detection circuit 43, and an output voltage setting detection circuit 44. The output current detecting circuit 41 detects the current being supplied to the cordless power tool 4 while the power switch 4b is turned ON, and the charge current being supplied to the battery pack 5 while the power switch 4b is turned OFF, and outputs a current signal accordingly to the voltage/current control circuit 21 for the purpose of adjusting the voltage supplied to the cordless power tool 4 to the level set by the voltage/current setting circuit 22. The voltage detection circuit 42 detects the voltage output from the second rectifying and smoothing circuit 13 and outputs a signal accordingly to the voltage/current control circuit 21 for the purpose of correcting for voltage drop across the cable 2b of the adapter 3. The trigger detection circuit 43 detects whether the power switch 4b is turned ON. When the trigger detection circuit 43 detects that the power switch 4b is turned ON, it instantaneously outputs a signal for disabling charging operations and a signal for enabling supply of power to the cordless power tool 4. The output voltage setting detection circuit 44 detects the voltage value set by the output voltage setter 3a of the adapter 3.

The battery condition detector 50 includes a battery voltage detection circuit 51 and a battery temperature detection circuit 52. The battery voltage detection circuit 51 detects battery voltage of the chargeable battery 5a. The battery temperature detection circuit 52 detects battery temperature indicated by the temperature sensor 5b in the battery pack 5.

The microcomputer 60 includes a central processing unit (CPU) 61, a random access memory (RAM) 62, and a read-only memory (ROM) 63 for performing a variety of different functions. For example, the microcomputer 60 sets the drive voltage supplied to the cordless power tool 4 based on output from the power source output detector 40 and, while the cordless power tool 4 is not being used, sets the charge current that is supplied to the battery pack 5 based on output from the battery condition detector 50. The microcomputer 60 also determines whether battery charge can be performed based on output from the battery condition detector 50 and on whether the cordless power tool 4 is in a condition of non-use, that is, whether the power switch 4b is turned OFF. When the microcomputer 60 determines that battery charge can be performed, the microcomputer 60 outputs a charge enabling signal to the charge output switch circuit 32 through the trigger detection circuit 43.

The main unit 2 also includes a display circuit 70 and an auxiliary power source circuit 80. The display circuit 70 is configured from an LED, for example, and displays a variety of information for the operator, such as, that the cordless power tool 4 is being used or is in a usable condition, or that the battery pack 5 is being charged. The auxiliary power source circuit 80 supplies a standard voltage Vcc to the power source of the microcomputer 60, and to the power source output controller 20, the power source output detector 40, the battery condition detector 50, and the like.

Next, configuration and operations for instantaneously stopping battery charge operations and switching to supply power to the cordless power tool 4 will be described with reference to FIG. 3.

Figure 3:
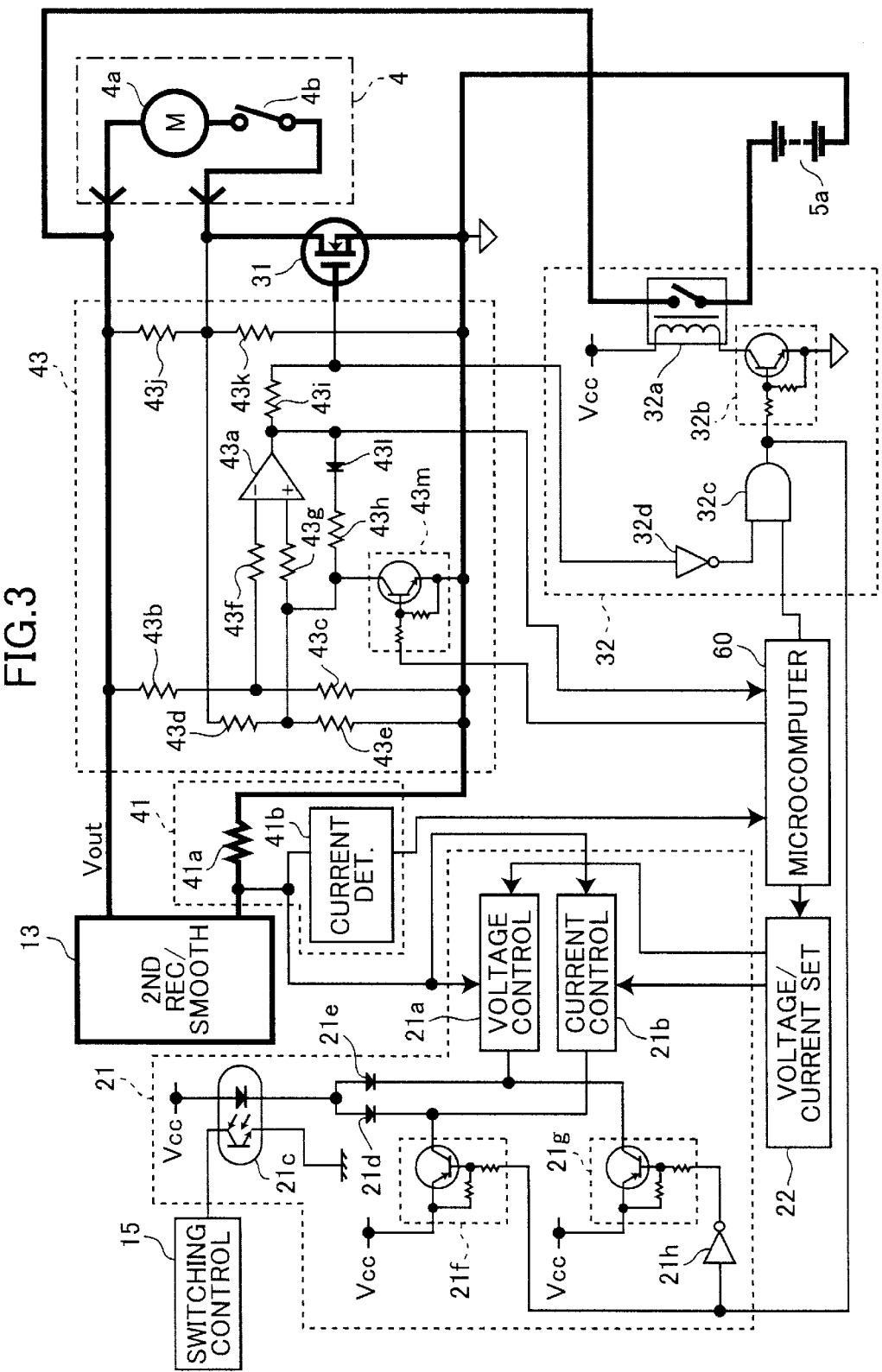
FIG. 3 is a circuit diagram, partially in block form, showing an electrical arrangement of the DC power source unit shown in FIG. 2.

As shown in FIG. 3, the voltage/current control circuit 21 includes a drive voltage control circuit 21a for controlling drive voltage for driving the cordless power tool 4, a charge current control circuit 21b for controlling charge current supplied to the battery 5a, a photocoupler 21c for feeding back to the switching control circuit 15 that controls the drive voltage and charge current to values set in the voltage/current setting circuit 22. The voltage/current control circuit 21 further includes diodes 21d, 21e and digital transistors 21f, 21g, and an inverter 21h. The inverter 21h inverts the signal output from the charge output switch circuit 32.

The charge output switch circuit 32 includes a relay 32a, a digital transistor 32b, an AND gate 32c, and an inverter 32d. The relay 32a turns ON and OFF the charge current supplied to the battery 5a. The digital transistor 32b drives the relay 32a. The inverter 32d inverts the output signal from the trigger detection circuit 43. The AND gate 32c enables battery charge based on the logical sum of the output from the microcomputer 60 and the inverted output of the trigger detection circuit 43.

The output current detecting circuit 41 includes a shunt resistor 41a and a current detection circuit 41b. The current detection circuit 41b amplifies the output from the shunt resistor 41a and inputs the current value to the microcomputer 60.

The trigger detection circuit 43 includes a comparator 43b, resistors 43a to 43k, a diode 43l, and a digital transistor 43m. The trigger detection circuit 43 is configured so that the comparator 43a outputs a logical value of "0" when the power switch 4b is turned OFF and a logical value of "1" when the power switch 4b is turned ON. That is, the inverting input terminal of the comparator 43a is applied with a voltage resulting from the output voltage Vout of the second rectifying and smoothing circuit 13 being divided by the resistors 43b, 43c. While the cordless power tool 4 is not in use, that is, when the power switch 4b is turned OFF, the non-inverting input terminal of the comparator 43a is applied with a voltage resulting from the output voltage Vout of the second rectifying and smoothing circuit 13 being divided by the resistors 43j, 43k, and further by the resistors 43d, 43e. The resisters 43b–43c, 43j–43k and 43d–43e are selected to result in the comparator 43a outputting a logical value of "0" while the power switch 4b is turned OFF.

On the other hand, when the power switch 4b is turned ON, the DC resistance of the DC motor 4a is extremely small compared to the resistor 43j. Therefore, the non-inverting input terminal of the comparator 43a will be applied with voltage resulting from dividing the output voltage Vout of the second rectifying and smoothing circuit 13 essentially by only the resistors 43d, 43e. The resistors 43d, 43e are selected to produce a voltage division ratio larger than the voltage division ratio of the resistors 43b, 43c, so that the comparator 43a is rendered to a logical value of "1" while the power switch 4b is turned ON. As a result, the microcomputer 60 can distinguish that the power switch 4b is turned ON when it receives a signal with logical value of "1" from the comparator 43a.

While the output from the comparator 43a is a logical value of "1", that is, while the power switch 4b is turned ON, then the output from the comparator 43a is fed back to the non-inverting input terminal via the diode 43l and the resistor 43h so that the output from the comparator 43a is latched as a logical value of "1". The power source output switch circuit 31 configured from an FET is maintained ON while it receives input of this logical value of "1" so that supply of drive voltage to the cordless power tool 4 is continued.

When the operator of the cordless power tool 4 releases the power switch 4a after using the cordless power tool 4, the main unit 2 switches to operations for charging the battery 5a in the following manner. The microcomputer 60 detects that the cordless power tool 4 is no longer being used based on output from the current detection circuit 41b, and applies a signal with a logical value of "1" to the base of the digital transistor 43m of the trigger detection circuit 43. This releases the latch condition of the comparator 43a so that the output from the comparator 43a is rendered to a logical value of "0". As a result, the power source output switch circuit 31 is turned OFF so that supply of power to the cordless power tool 4 is stopped. On the other hand, when the output from the comparator 43a is rendered to a logical value of "0", a signal having a logical value of "1" is applied to one input terminal of the AND gate 32c of the charge output switch circuit 32 via the inverter 32d. At this time, the microcomputer 60 applies a charge enable signal having a logical value of "1" to the other input terminal of the AND gate 32c so that the AND gate 32c produces an output with a logical value of "1". As a result, the relay 32a is turned ON by the digital transistor 32b and a charge current is supplied to the battery 5a.

When battery charge is enabled, the signal with a logical value of "1" from the AND gate 32c is inverted by the inverter 21h of the voltage/current control circuit 21, thereby turning the digital transistor 21g ON. As a result, the drive voltage control circuit 21a for controlling drive voltage of the cordless power tool 4 is rendered inoperative. Simultaneously with this, the digital inverter 21f of the voltage/current control circuit 21 is turned OFF. As a result, the charge current control circuit 21b is rendered operative and so can control charge current.

On the other hand, when the power switch 4b of the cordless power tool 4 is turned ON while the battery 5a is being charged, then the output from the comparator 43a is rendered to a logical value of "1" so that a logical value of "0" is applied to one of the input terminals of the AND gate 32c through the inverter 32d. As a result, even if the microcomputer 60 generates a charge enabling signal with a logical value of "1" to another input terminal of the AND gate 32c, the output from the AND gate 32c is changed to a logical value of "0" so that the digital transistor 32b is rendered OFF and so the relay 32a is also rendered OFF. In this manner, supply of charge current to the chargeable battery 5a is interrupted.

When the power switch 4b of the cordless power tool 4 is turned ON while the battery 5a is being charged, then the signal with a logical value of "0" from the AND gate 32c turns OFF the digital transistor 21g via inverter 21h of the voltage/current control circuit 21 so that the drive voltage control circuit 21a for controlling drive voltage applied to the cordless power tool 4 is rendered operative. The signal with a logical value of "0" from the AND gate 32c turns ON the digital transistor 21f of the voltage/current control circuit 21 so that the charge current control circuit 21b is rendered inoperative.

According to the first embodiment described above, DC power is instantaneously supplied to the cordless power tool 4, even if the power switch 4b of the cordless power tool 4 is turned ON while the main unit 2 is charging the battery pack 5. Therefore, the operator is able to use the cordless power tool 4 without getting the feeling something is wrong and operability of the cordless power tool 4 is enhanced.

Figure 4A:
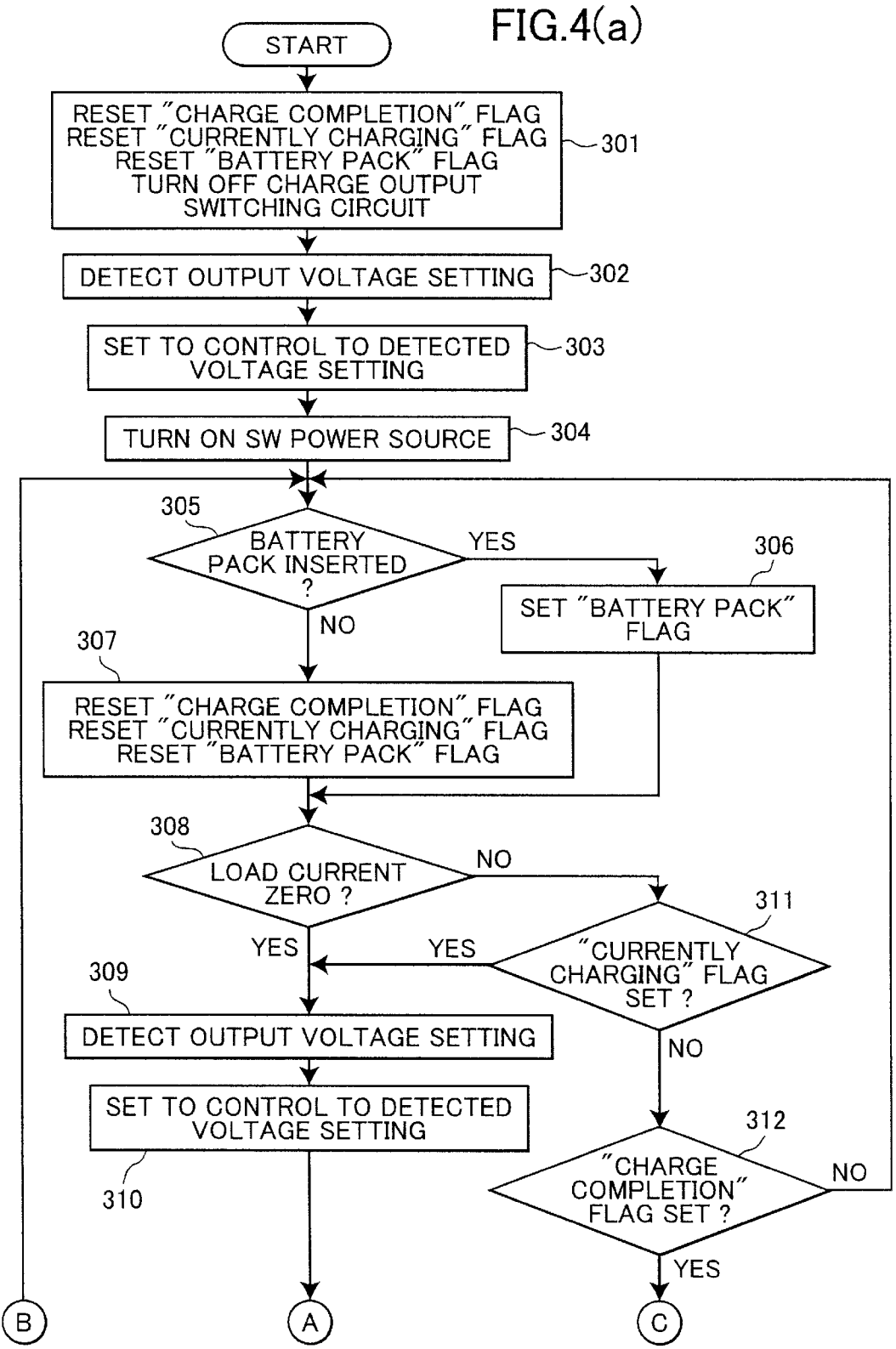

Next, a second embodiment of the invention will be described with reference to the flowchart of FIGS. 4(a) and 4(b). The second embodiment is directed to a DC power source unit that is capable of outputting a designated drive voltage corresponding to the rated drive voltage of a cordless power tool and capable of charging battery packs with a different battery voltages. The DC power source unit of the second embodiment has a circuit configuration same as that shown in FIGS. 2 and 3.

When the AC cord 1 is connected to a commercial 100V AC power source, the microcomputer 60 and other components, such as the power source output controller 20, are supplied with a standard voltage Vcc from the auxiliary power source circuit 80. In step 301, the microcomputer 60 sets various initial settings, such as resetting a "charge completion" flag, a "currently charging" flag, and a "battery pack" flag in the RAM 62 of the microcomputer 60, and outputting a signal for turning OFF the charge output switch circuit 32 of the power source output switcher 30. The "battery pack" flag indicates whether or not the battery pack 5 is inserted into the battery pack insertion recess 2a of the main unit 2.

Next in step 302, the microcomputer 60 determines what voltage is to be output to the cordless power tool 4. The output voltage setter 3a develops a setting voltage that corresponds to the rated voltage of corresponding cordless power tool 4. The output voltage setting detection circuit 44 detects the setting voltage from the output voltage setter 3a and outputs a signal indicative of the setting voltage to the microcomputer 60. The microcomputer 60 detects the signal from the output voltage setting detection circuit 44 to detect the setting voltage of the adapter 3.

In step 303, the microcomputer 60 outputs a signal that corresponds to the detected setting voltage to the voltage/current setting circuit 22. As a result, the voltage/current setting circuit 22 controls the output voltage to the particular drive voltage that corresponds to the detected setting voltage. In step 304, the microcomputer 60 outputs a start-up signal to the switching control circuit 15, thereby causing the switching power source 10 to operate. In this condition, when the power switch 4b of the cordless power tool 4 is turned ON, then the trigger detection circuit 43 of the power source output detector 40 turns ON the power source output switch circuit 31 of the power source output switcher 30 so that a drive voltage that corresponds to the rated voltage of the presently-connected cordless power tool 4 is supplied from the switching power source 10 to the cordless power tool 4.

Next, in step 305, the microcomputer 60 judges whether the battery pack 5 is inserted into the battery pack insertion recess 2a of the main unit 2 based on output from the battery voltage detection circuit 51 and the battery temperature detection circuit 52 of the battery condition detector 50. If a battery pack 5 is judged to be inserted into the battery pack insertion recess 2a (step 305:YES), then in step 306 the microcomputer 60 sets the "battery pack" flag. If not (step 305:NO), then in step 307 the microcomputer 60 resets the "charge completion" flag, the "currently charging" flag, and the "battery pack" flag in the RAM 62. Next, in step 308 the microcomputer 60 determines whether the power switch 4b has been turned OFF by detecting the output from the output current detecting circuit 41 to judge whether the load current is zero.

When the load current is determined to be zero (step 308:YES), this indicates that the power switch 4b may have been turned OFF and the cordless power tool 4 replaced with another cordless power tool 4 with a different rated voltage. Therefore, in step 309, the microcomputer 60 again detects setting of the output voltage based on output from the output voltage setting detection circuit 44, which detects the set voltage of the output voltage setter 3a. In step 310, the microcomputer 60 outputs a signal to the voltage/current setting circuit 22 in order to control the output drive voltage to correspond to the detected set voltage.

In step 313, it is judged whether a battery pack 5 is inserted into the main unit 2. If not, then the program returns to step 305. On the other hand, when it is judged that a battery pack 5 is inserted into the main unit 2 (step 313:YES), then in step 314 the microcomputer 60 judges whether the temperature of the battery pack 5 is too high to enable charge based on output from the battery temperature detection circuit 52. If the battery pack 5 is at a high temperature (step 314:YES), then the program returns to step 305.

On the other hand, when it is determined that the battery pack 5 is not at a high temperature (step 314:NO), then in step 315 then the microcomputer 60 monitors whether the power switch 4b is turned ON based on the output from the trigger detection circuit 43. When the power switch 4b is turned ON (step 315:YES), then the microcomputer 60 outputs a signal for turning OFF the charge output switch circuit 32 in step 316 and resets the "currently charging" flag in step 317. Then, the program returns to step 305.

On the other hand, when it is judged in step 315 that the power switch 4b is not turned ON (step 315:NO), then in step 318 the microcomputer 60 outputs a signal to the voltage/current setting circuit 22 for setting the charge current to a predetermined value in order to control the charge current to the predetermined value. Next, in step 319 the microcomputer 60 outputs a charge enabling signal to the trigger detection circuit 43 and the charge output switch circuit 32. At the instant that the power source output switch circuit 31 is turned OFF via the trigger detection circuit 43, then in step 320 the microcomputer 60 turns ON the charge output switch circuit 32 to start charging operations and sets the "currently charging" flag.

As soon as battery charging operations start, then in step 321 the microcomputer 60 judges whether the battery pack 5 has been fully charged based on input to the microcomputer 60 via the battery voltage detection circuit 51 and/or the battery temperature detection circuit 52. There are many well know methods of detecting whether a battery is fully charged. For example, the fully charged condition of the battery pack 5 can be detected based on battery voltage. Specifically, when the peak of the battery voltage is detected or when the battery voltage drops a predetermined value from the peak voltage (referred to as—ΔV detection), the battery pack 5 is determined to be fully charged. The battery pack 5 can also be determined to be fully charged based on battery temperature, such as from output of a battery temperature detection circuit 52, or based on both battery voltage and battery temperature. However, the method of detecting whether a battery is fully charged is not the main point of the present invention, so details of the detection method will be omitted.

When it is judged that the battery pack 5 is not fully charged (step 321:NO), then the program returns to step 305. On the other hand, when it is judged that the battery pack 5 is fully charged (step 321:YES), then in step 322 the "currently charging" flag is reset, in step 323 the "charge completion" flag is set, and in step 324 the charge output switch circuit 32 is turned OFF. Then, the program returns to step 305.

When it is judged that the load current is not zero (step 308:NO), then in step 311 the microcomputer 60 judges whether battery charge is presently being performed. If so (step 311:YES), then the program returns to step 309. In this case, the cordless power tool 4 may have been replaced by another cordless power tool 4 with a different rated voltage. Therefore, in step 309, the microcomputer 60 again detects setting of the output voltage based on output from the output voltage setting detection circuit 44, which detects the set voltage of the output voltage setter 3a. In step 310, the microcomputer 60 outputs a signal to the voltage/current setting circuit 22 in order to control the output drive voltage to correspond to the detected set voltage. Steps 309 and 310 must be performed during battery charge, because the microcomputer 60 does not directly participate in the operation for switching from charging the battery pack 5 to supplying power to the cordless power tool 4. Steps 309 and 310 enable switching the presently-connected cordless power tool 4 at any time to one with a different rated voltage and enable rapidly coping with such a switch.

When it is judged that charging is not being performed (step 311:NO), then in step 312 it is judged whether charging has been completed. If so (step 312:YES), then the program jumps to step 323. If not (step 312:NO), then the program returns to step 305.

With the configuration described in the embodiment, a single main unit 2 can output drive voltages that correspond to the rated voltages of a variety of different cordless power tool 4 and also charge a variety of battery packs 5 with different battery voltages.

While the invention has been described in detail with reference to specific embodiments thereof, it would be apparent to those skilled in the art that various changes and modifications may be made therein without departing from the spirit of the invention, the scope of which is defined by the attached claims.

For example, the second embodiment describes that the DC power source unit 100 charges using the same charge current batteries regardless of the battery voltage. However, the charge current could be controlled in accordance with the battery voltage. Alternatively, the charge current can be controlled to charge battery packs 5 with different battery voltages in accordance with the maximum capacity of the switching power source 10. Explained in more detail, the average charge current is made small in accordance with the number of cells in the battery pack 5 to enhance the cycle life characteristic in accordance with increase in the number of cells.

What is claimed is:

1. A DC power source unit used as a power source of an electrically powered tool and having a charging function for charging a battery pack used as an alternative power source of the tool, the tool having a power switch, the DC power source unit comprising:

a switching power source for implementing an AC-DC conversion and providing a DC power;

a battery pack connecting portion for connecting the battery pack to charge with the DC power provided from the switching power source;

an adapter for supplying the DC power provided from the switching power source to the tool;

a power source output controller for controlling the DC power provided from the switching power source in accordance with the DC power supplied to the tool and to the battery pack;

a power output switching circuit for switching between supplying the DC power to the tool through the adapter and charging the battery pack; and a trigger detector for detecting that the power switch of the tool is turned ON and outputting an ON signal indicative of ON of the power switch to the power output switching circuit, wherein in response to the ON signal, the power output switching circuit instantaneously allows the DC power to be supplied to the tool and prohibits the battery pack from being charged.

2. The DC power source unit according to claim 1, wherein the power output switching circuit comprises a power source output switch circuit for enabling and disabling supply of DC power to the tool, and a charge output switch circuit for enabling and disabling charge of the battery pack.

3. The DC power source unit according to claim 2, wherein when the trigger detector detects that the power switch of the tool is turned ON, the trigger detector outputs a first ON signal to the power source output switch circuit and a first OFF signal to the charge output switch circuit, the power source output switch circuit allowing the DC power to be supplied to the tool in response to the first ON signal and the charge output switch circuit prohibiting the DC power from being supplied to battery pack in response to the first OFF signal.

4. The DC power source unit according to claim 2, wherein when the trigger detector detects that the power switch of the tool is turned OFF, the trigger detector outputs a second OFF signal to the power source output switch circuit and a second ON signal to the charge output switch circuit, the power source output switch circuit prohibiting the DC power from being supplied to the tool in response to the second OFF signal.

5. The DC power source unit according to claim 4, further comprising a battery condition detector for detecting a condition of the batter pack and providing a battery condition signal, wherein the charge output switch circuit allows the DC power to be supplied to the battery pack in response to the second ON signal and the battery condition signal.

6. The DC power source unit according to claim 5, wherein the battery condition detector comprises a battery voltage detector for detecting a voltage developed across the battery pack, and a battery temperature detector for detecting a temperature of the battery pack.

7. The DC power source unit according to claim 2, wherein the power source output controller comprises a voltage/current control circuit for adjusting DC voltage and DC current from the switching power source to match designated values, the voltage/current control circuit comprising a drive voltage control circuit for controlling voltage supplied to the tool, and a charge current control circuit for controlling charge current supplied to the battery pack, the voltage/current control circuit, based on output of the charge output switch circuit, switching to the charge current control circuit during charge times and switching to the drive voltage control circuit while the tool is being used.

8. The DC power source unit according to claim 1, wherein the adaptor and the battery pack are selectively and detachably connected to the tool, wherein the adaptor and the battery pack have connection parts connected to the tool, the connection parts being substantially identical in shape.

9. The DC power source unit according to claim 2, wherein the power source output switch circuit comprises a transistor.

10. The DC power source unit according to claim 1, wherein the trigger detector comprises a comparator having first input terminal, a second input terminal, and an output terminal, a first set of resistors providing a first voltage applied to the first input terminal, a second set of resistors providing a second voltage when the power switch is turned OFF, a third set of resistors providing a third voltage when the power switch is turned ON, wherein selective one of the second voltage and the third voltage is applied to the second input terminal, the output terminal outputting the ON signal when the first voltage is applied to the first input terminal and the third voltage is applied to the second input terminal.

11. The DC power source unit according to claim 10, wherein the trigger detector outputs an OFF signal indicative of OFF of the power switch to the power output switching circuit, wherein in response to the OFF signal, the power output switching circuit prohibits the DC power from being supplied to the tool and allows the battery pack to be charged, the output terminal of the comparator outputting the OFF signal when the first voltage is applied to the first input terminal and the second voltage is applied to the second input terminal.

12. A DC power source unit used as a power source of an electrically powered tool and having a charging function for charging a battery pack used as an alternative power source of the tool, the tool having a power switch, the DC power source unit comprising:

a switching power source for implementing an AC-DC conversion and providing a DC power;

a battery pack connecting portion for connecting the battery pack to charge with the DC power provided from the switching power source;

an adapter for supplying the DC power provided from the switching power source to the tool;

a power source output controller for controlling the DC power provided from the switching power source in accordance with the DC power supplied to the tool and to the battery pack;

a power output switching circuit for switching between supplying the DC power to the tool through the adapter and charging the battery pack;

a battery condition detector for detecting a condition of the battery pack and providing a battery condition signal;

a trigger detector for detecting that the power switch of the tool is turned OFF and outputting an OFF signal indicative of OFF of the power switch;

an output current detector for detecting output current from the switching power source and outputting an output current detection signal; and a controller for controlling the power output switching circuit to switch to charging the battery pack in response to the OFF signal, the output current detection signal, and the battery condition signal.

13. A DC power source unit used as a power source of a plurality of different electrically powered tools and having a charging function for charging a plurality of different battery packs used as an alternative power source of the tools, each of the tools having a power switch, the DC power source unit comprising:

a switching power source for implementing an AC-DC conversion and providing selective one of a plurality of different output voltages corresponding to a plurality of different drive voltages of the tools and selective one of a plurality of different charge currents corresponding to the plurality of different battery packs;

a battery pack connecting portion for connecting each of the plurality of battery packs to charge with a corresponding charge current;

an adapter for supplying an output voltage among the plurality of different output voltages to a corresponding tool;

a voltage/current setting circuit for setting the output voltage and the charging current output from the switching power source to predetermined values;

a power output switching circuit for switching between supplying the DC power to the tool through the adapter and charging the battery pack;

a battery condition detector for detecting a condition of the battery pack and providing a battery condition signal;

a power source output detector for detecting the output voltage and the charging current from the switching power source and also detecting that the power switch of the tool is turned ON, and for outputting a power source output detection signal;

an output current detector for detecting output current from the switching power source and outputting an output current detection signal; and a controller for controlling, based on the power source output detection signal, the voltage/current setting circuit so that the voltage/current setting circuit sets the output voltage to a value corresponding to a rated voltage of the tool.

14. The DC power source unit according to claim 13, wherein the adapter includes an output voltage setting unit that indicates the rated voltage of the tool.

15. The DC power source unit according to claim 14, wherein the power source output detector includes an output voltage setting detector for detecting set voltage of the output voltage setting unit and outputting a set voltage detection signal, the switching power source outputting an output voltage corresponding to the rated voltage of the tool based on the set voltage detection signal.

16. A DC power source unit used as a power source of a plurality of different electrically powered tools and having a charging function for charging a plurality of different battery packs used as an alternative power source of the tools, each of the tools having a power switch, the DC power source unit comprising:

a switching power source for implementing an AC-DC conversion and providing selective one of a plurality of different output voltages corresponding to a plurality of different drive voltages of the tools and selective one of a plurality of different charge currents corresponding to the plurality of different battery packs;

a battery pack connecting portion for connecting each of the plurality of battery packs to charge with a corresponding charge current;

an adapter for supplying an output voltage among the plurality of different output voltages to a corresponding tool;

a voltage/current setting circuit for setting the output voltage and the charging current output from the switching power source to predetermined values;

a power output switching circuit for switching between supplying the DC power to the tool through the adapter and charging the battery pack;

a battery condition detector for detecting a condition of the battery pack and providing a battery condition signal;

a power source output detector for detecting the output voltage and the charging current from the switching power source and also detecting that the power switch of the tool is turned ON, and for outputting a power source output detection signal;

an output current detector for detecting output current from the switching power source and outputting an output current detection signal; and a controller that judges, based on the battery condition signal from the battery condition detector, whether the battery pack is connected to the battery pack connecting portion, whether battery temperature of the battery pack is at a high temperature higher than a predetermined temperature, and whether the battery pack is fully charged, that controls the voltage/current setting circuit so that a predetermined charge current is supplied from the switching power source regardless of the voltage of the battery pack, and that further controls the power output switching circuit to switch to charging the battery pack when it is judged that the battery pack can be charged based on the battery condition signal from the battery condition detector.

17. The DC power source according to claim 16, wherein the battery condition detector comprises a battery voltage detector that detects battery voltage of the battery pack, and a battery temperature detector that detects battery temperature of the battery pack.

* * * * *